(12) United States Patent
Yanaka et al.

(10) Patent No.: US 11,667,215 B2
(45) Date of Patent: Jun. 6, 2023

(54) VEHICLE

(71) Applicant: TOYOTA JIDOSHA KABUSHIKI KAISHA, Toyota (JP)

(72) Inventors: Akihiro Yanaka, Nagoya (JP); Shinji Kurachi, Kariya (JP); Yoshinori Ikegami, Kariya (JP); Yoshikazu Tanoue, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/530,968

(22) Filed: Nov. 19, 2021

(65) Prior Publication Data

US 2022/0161689 A1 May 26, 2022

(30) Foreign Application Priority Data

Nov. 24, 2020 (JP) .............................. JP2020-194125

(51) Int. Cl.
*B60N 2/005* (2006.01)
*B60N 2/90* (2018.01)

(52) U.S. Cl.
CPC .............. *B60N 2/005* (2013.01); *B60N 2/90* (2018.02); *B60Y 2304/07* (2013.01)

(58) Field of Classification Search
CPC ................................... B60N 2/90; B60N 2/005
USPC ........................................... 297/463.1, 463.2
See application file for complete search history.

(56) References Cited

U.S. PATENT DOCUMENTS

2014/0103627 A1* 4/2014 Deckard ................ B60N 2/005
411/362
2015/0283931 A1* 10/2015 Line ........................ B60N 2/62
297/423.19
2018/0065515 A1* 3/2018 Line

FOREIGN PATENT DOCUMENTS

CN 110077289 A * 8/2019
JP 2013-177035 A 9/2013

* cited by examiner

*Primary Examiner* — Anthony D Barfield
(74) *Attorney, Agent, or Firm* — Dinsmore & Shohl LLP (57) ABSTRACT

The technology described in the present specification is embodied in a vehicle. The vehicle includes a vehicle body, a seat, and a seat bracket. The vehicle body includes a pipe material extending in the vehicle right-left direction. The seat is provided in the vehicle body, and an occupant of the vehicle sits on the seat. The seat is fixed to the pipe material via the seat bracket. The seat bracket includes a bracket lower and a bracket upper. The bracket lower is placed below the pipe material. The bracket upper is placed above the pipe material such that the pipe material is sandwiched between the bracket upper and the bracket lower.

9 Claims, 4 Drawing Sheets

VEHICLE

CROSS-REFERENCE TO RELATED APPLICATION

This application claims priority to Japanese Patent Application No. 2020-194125 filed on Nov. 24, 2020, incorporated herein by reference in its entirety.

BACKGROUND

1. Technical Field

The technology described in the present specification relates to a vehicle. The technology relates to a vehicle including a seat on which an occupant of the vehicle sits, and a seat bracket via which the seat is fixed to a vehicle body of the vehicle.

2. Description of Related Art

Japanese Unexamined Patent Application Publication No. 2013-177035 (JP 2013-177035 A) describes a vehicle in which a seat is fixed to a vehicle body. The seat is fixed to a floor panel (referred to as a floor member in JP 2013-177035 A) of the vehicle body via a seat bracket.

SUMMARY

Loads can be applied from various directions to the seat bracket via which the seat is fixed to the vehicle body. For example, when the vehicle is traveling, vibrations of the vehicle can be applied to the seat bracket as loads in the up-down direction. For example, when the vehicle has a front end collision, inertia force to the weight of the seat, including the weight of the occupant fixed by a seat belt, can be applied to the seat bracket as loads in the forward direction and in the upward direction. In view of this, high rigidity to loads in various directions is demanded for the vehicle body to which the seat bracket is fixed. In the meantime, in order to simplify a vehicle structure, it is conceivable that at least part of the vehicle body is constituted by pipe materials, and the seat bracket is fixed to a pipe material extending in the vehicle right-left direction among the pipe materials. In this case, when a large load is applied to the seat bracket, the pipe material to which the seat bracket is fixed might deform. The present specification provides a technology that can restrain deformation of a pipe material in a vehicle in which a seat is fixed to the pipe material via a seat bracket.

The technology described in the present specification is embodied in a vehicle. The vehicle includes a vehicle body, a seat, and a seat bracket. The vehicle body includes a pipe material extending in the vehicle right-left direction. The seat is provided in the vehicle body such that an occupant of the vehicle sits on the seat. The seat is fixed to the pipe material via the seat bracket. The seat bracket includes a bracket lower and a bracket upper. The bracket lower is placed below the pipe material. The bracket upper is placed above the pipe material such that the pipe material is sandwiched between the bracket upper and the bracket lower.

In the vehicle described above, the seat bracket is configured such that the pipe material is sandwiched between the bracket lower and the bracket upper in the up-down direction. Hereby, when a load directed upward is applied to the pipe material, the bracket lower on the lower side restrains deformation of the pipe material. When a load directed downward is applied to the pipe material, the bracket upper on the upper side restrains deformation of the pipe material. Thus, in the vehicle described in the present specification, by sandwiching the pipe material by the seat bracket from the upper side and the lower side, deformation of the pipe material due to a load from the seat is restrained.

Technical details described in the present specification and further improvements thereof are described in "DETAILED DESCRIPTION OF EMBODIMENTS."

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

In one aspect of the technology, the vehicle body may further include a second pipe material placed behind the pipe material in the vehicle front-rear direction. In this case, the bracket upper may extend rearward in the vehicle front-rear direction from the pipe material toward the second pipe material and may be fixed to the second pipe material from below. With such a configuration, it is possible to disperse various loads to be applied to the seat bracket by two pipe materials. As a result, it is possible to further restrain deformation of the pipe material. Further, by placing the second pipe material behind the pipe material in the vehicle front-rear direction, it is possible to restrain displacement of the seat bracket due to vibrations or the like during traveling of the vehicle, for example. That is, the second pipe material can further strengthen the fixation of the seat bracket to the pipe material.

In one aspect of the technology, the seat bracket may further include a second bracket upper placed above the second pipe material such that the second pipe material is sandwiched between the second bracket upper and the bracket upper. With such a configuration, it is possible to restrain deformation of the second pipe material, thereby making it possible to further restrain the deformation of the pipe material.

In one aspect of the technology, the seat bracket may further include a third bracket upper. In this case, the third bracket upper may be adjacent to the bracket upper in the vehicle right-left direction and placed above the pipe material such that the pipe material is sandwiched between the third bracket upper and the bracket lower. With such a configuration, the pipe material can be sandwiched between one bracket lower extending in the vehicle right-left direction and each of two adjacent bracket uppers. As a result, it is possible to further restrain the deformation of the pipe material.

In one aspect of the technology, the third bracket upper may have the same shape as the bracket upper. With such a configuration, the third bracket upper and the bracket upper can be made common. As a result, productivity of the vehicle improves.

In one aspect of the technology, the seat bracket may further include a fourth bracket upper. In this case, the fourth bracket upper may be placed above the second pipe material such that the second pipe material is sandwiched between the fourth bracket upper and the third bracket upper. With such a configuration, it is possible to restrain the deformation of the second pipe material, thereby making it possible to further restrain the deformation of the pipe material.

In one aspect of the technology, the fourth bracket upper may have the same shape as the second bracket upper. With such a configuration, the fourth bracket upper and the second bracket upper can be made common. As a result, the productivity of the vehicle improves.

In one aspect of the technology, at least either of the pipe material and the second pipe material may be made of high tensile steel. With such a configuration, the pipe material made of high tensile steel can further hardly deform. The high tensile steel as used herein indicates a steel material having a tensile strength of 1000 MPa or more and is also referred to as super high tensile steel.

In one aspect of the technology, the vehicle body may further include a floor panel placed below the pipe material. In this case, a battery as a driving power supply for the vehicle may be provided below the floor panel. A vehicle in which a battery is provided below a floor panel may not have a sufficient space for reinforcing the floor panel. Accordingly, the technology to fix the seat bracket to the pipe material is particularly suitable for such a vehicle.

In one aspect of the technology, an electric device connected to the battery may be provided between the floor panel and the seat. A vehicle in which an electric device is provided between a floor panel and a seat may not have a sufficient space for reinforcing the floor panel. Accordingly, the technology to fix the seat bracket to the pipe material is particularly suitable for such a vehicle.

Embodiment

Figure 1:
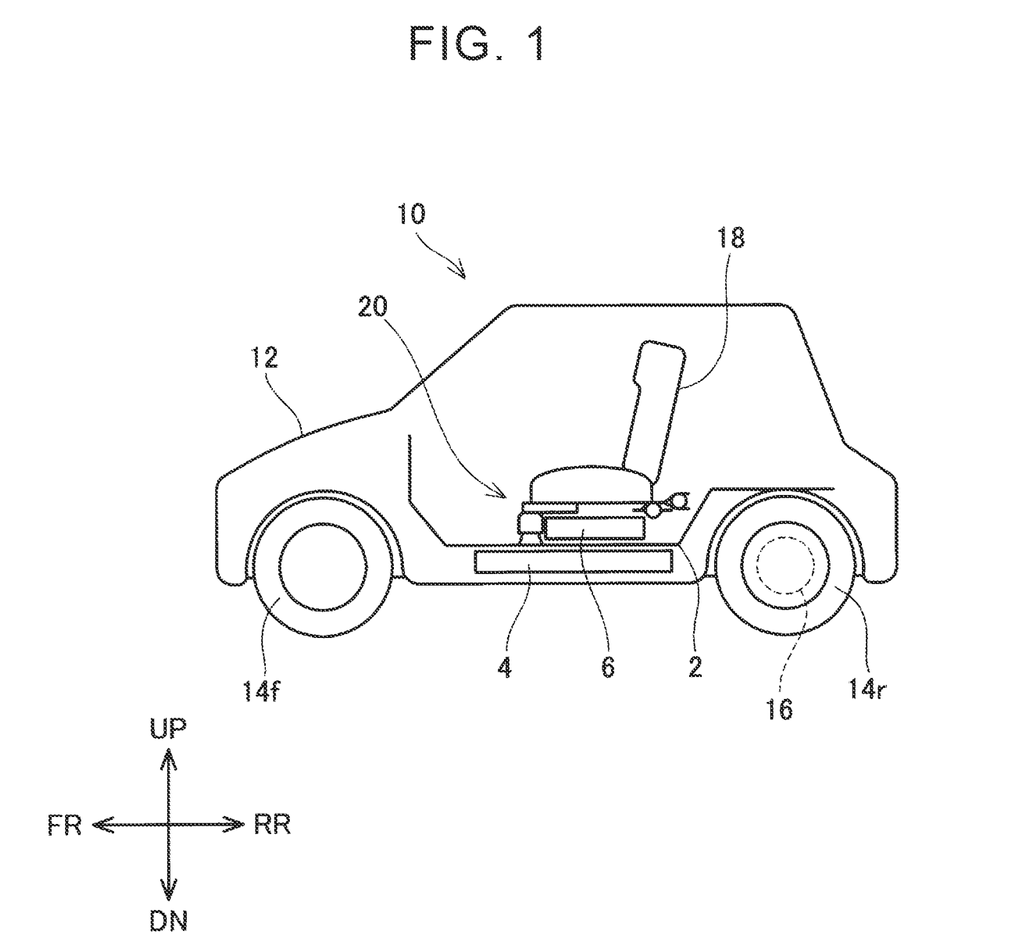
FIG. 1 is a left side view schematically illustrating a whole vehicle according to an embodiment.

With reference to the drawings, a vehicle according to an embodiment will be described. With reference to FIG. 1, the following describes a vehicle 10 according to the embodiment. Although the vehicle 10 is not limited in particular, the vehicle 10 is a so-called automobile and is a vehicle traveling on a road surface. Here, a direction FR in the drawings indicates the front side in the front-rear direction (the longitudinal direction) of the vehicle 10, and a direction RR indicates the rear side in the front-rear direction of the vehicle 10. Further, a direction LH indicates the left side in the right-left direction (the width direction) of the vehicle 10, and a direction RH indicates the right side in the right-left direction of the vehicle 10. A direction UP indicates the upper side in the up-down direction (the height direction) of the vehicle 10, and a direction DN indicates the lower side in the up-down direction of the vehicle 10. Note that, in the present specification, the front-rear direction, the right-left direction, and the up-down direction of the vehicle 10 may be just referred to as the front-rear direction, the right-left direction, and the up-down direction.

As illustrated in FIG. 1, the vehicle 10 includes a vehicle body 12, a plurality of wheels 14f, 14r, and a seat 18. The vehicle body 12 forms a framework and an appearance of the vehicle 10. The vehicle body 12 is not limited in particular, but the vehicle body 12 is formed by use of a metallic material and a resin material. An occupant (not illustrated) of the vehicle 10 sits on the seat 18. The vehicle body 12 includes a floor panel 2 and a seat mount 20. The floor panel 2 is a sheet metal part constituting a floor of a passenger compartment of the vehicle 10. The floor panel 2 is placed below the seat mount 20 and extends along the vehicle front-rear direction. The seat mount 20 is a member configured to fix the seat 18. A detailed structure in which the seat 18 is fixed via the seat mount 20 will be described later with reference to FIGS. 2 to 4. The wheels 14f, 14r are rotatably attached to the vehicle body 12. The wheels 14f, 14r include a pair of front wheels 14f and a pair of rear wheels 14r. Note that the number of the wheels 14f, 14r is not limited to four. The vehicle 10 in the present embodiment has a small size for two occupants, but the size of the vehicle 10 and the number of occupants in the vehicle 10 are also not limited in particular.

The vehicle 10 further includes a drive motor 16, a battery unit 4, and an electric device unit 6. The drive motor 16 is connected to the rear wheels 14r, so that the drive motor 16 can drive the rear wheels 14r. Note that the drive motor 16 is not limited to driving the rear wheels 14r, provided that the drive motor 16 is configured to drive at least one of the wheels 14f, 14r. The battery unit 4 is electrically connected to the drive motor 16 via the electric device unit 6, so that the battery unit 4 supplies electric power to the drive motor 16. That is, the battery unit 4 is a driving power supply for the vehicle 10. A plurality of secondary battery cells is incorporated in the battery unit 4, so that the battery unit 4 is chargeable repeatedly by electric power received from outside. Note that the vehicle 10 may include other power supplies such as a fuel cell unit or a solar panel in addition to or instead of the battery unit 4. Further, the vehicle 10 may include other motors such as an engine in addition to or instead of the drive motor 16. The electric device unit 6 includes a device configured to convert direct current power stored in the battery unit 4 into alternating current power suitable for the drive motor 16. Further, the electric device unit 6 includes a device configured to boot direct current power in the battery unit 4 to a voltage by which the drive motor 16 is drivable.

Figure 2:
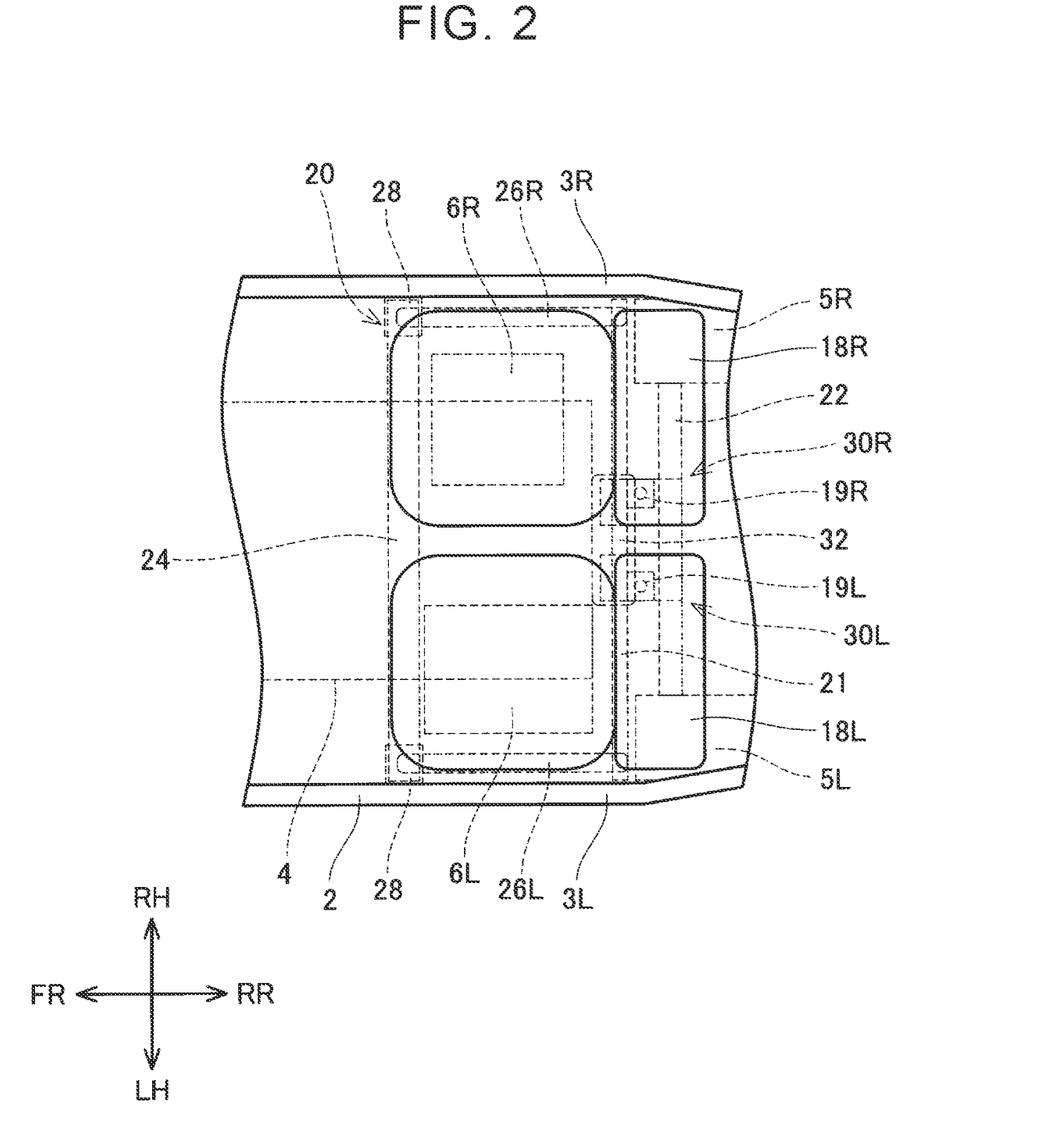
FIG. 2 is a plane view of a vehicle body of the vehicle according to the embodiment.

As illustrated in FIG. 1, in the vehicle 10, the battery unit 4 is placed below the floor panel 2. As illustrated in FIG. 2, the battery unit 4 covers half or more of a lower surface of the floor panel 2. Hereby, the number of secondary battery cells included in the battery unit 4 can be increased. As a result, a power storage amount in the battery unit 4 increases. Further, as illustrated in FIG. 1, the electric device unit 6 is placed between the floor panel 2 and the seat 18. Particularly, a small electric automobile like the vehicle 10 does not have a sufficient arrangement space for the battery unit 4, the electric device unit 6, and so on. The vehicle 10 secures an arrangement space for the electric device unit 6 and the battery unit 4 covering half or more of the lower surface of the floor panel 2 by fixing the seat 18 to the seat mount 20. As a result, the battery unit 4 is placed below the floor panel 2, and the electric device unit 6 is placed between the floor panel 2 and the seat 18.

With reference to FIG. 2, the following will describe the structure for fixing the seat 18 to the vehicle body 12. The vehicle body 12 further includes a right rocker 3R, a left rocker 3L, a right side member 5R, and a left side member 5L. The right rocker 3R is provided in a right end part (that is, on the upper side on the plane of paper of FIG. 2) of the floor panel 2 so as to extend in the front-rear direction. The left rocker 3L is provided in a left end part (that is, on the lower side on the plane of paper of FIG. 2) of the floor panel 2 so as to extend in the front-rear direction. The rockers 3R, 3L are joined to an upper surface of the floor panel 2. The rockers 3R, 3L are structural bodies configured to protect the vehicle body 12 when the vehicle 10 (see FIG. 1) has a collision. Further, the right side member 5R is connected to a rear end of the right rocker 3R. The left side member 5L is connected to a rear end of the left rocker 3L. Similarly to the rockers 3R, 3L, the side members 5R, 5L are configured to protect the vehicle body 12.

Figure 4:
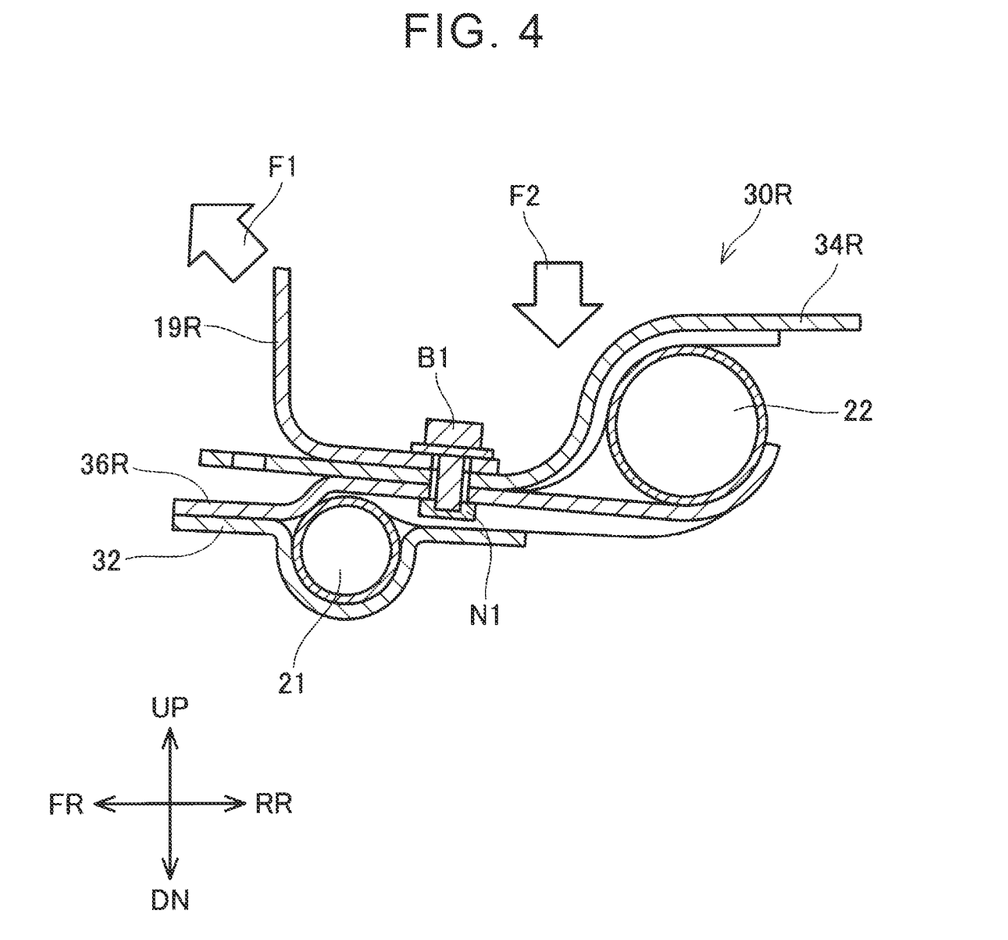
FIG. 4 is a sectional view taken along a line IV-IV in FIG. 3.

The seat mount 20 is a member to which a right seat 18R and a left seat 18L of the seat 18 are fixed. The seat mount 20 includes a first pipe material 21, a second pipe material 22, a front crossmember 24, a right seat member 26R, a left seat member 26L, and leg portions 28. The first pipe material 21 is a pipe material provided in a rear part of the seat 18 so as to extend in the vehicle right-left direction (that is, in the up-down direction on the plane of paper of FIG. 2). As illustrated in FIG. 4, the first pipe material 21 has a circular section and extends in the right-left direction with a constant section. By employing a pipe material as a member of the seat mount 20, it is possible to simplify a metal die or the like for forming the first pipe material 21. That is, the seat mount 20 can be formed relatively easily. Further, the first pipe material 21 is constituted by a pipe material of high tensile steel. The high tensile steel as used herein indicates a steel material having a tensile strength of 1000 MPa or more and is also referred to as super high tensile steel. Although the first pipe material 21 of the vehicle 10 of the present embodiment is not limited in particular, the first pipe material 21 is formed such that the high tensile steel is heated and subjected to special processing, so that the first pipe material 21 has a tensile strength of about 1500 Mpa. Thus, by constituting the first pipe material 21 by the pipe material of the high tensile steel with a high tensile strength, it is possible to restrain deformation of the first pipe material 21.

A right end part (that is, on the upper side on the plane of paper of FIG. 2) of the first pipe material 21 is joined to the right rocker 3R. Similarly, a left end part (that is, on the lower side on the plane of paper of FIG. 2) of the first pipe material 21 is joined to the left rocker 3L. The first pipe material 21 connects the rockers 3R, 3L to each other in the vehicle right-left direction. Hereby, particularly when the vehicle 10 has a side collision, the first pipe material 21 can restrain deformation of the vehicle body 12 in the right-left direction.

The second pipe material 22 is placed behind the first pipe material 21 in the vehicle front-rear direction (that is, on the right side on the plane of paper of FIG. 2). The second pipe material 22 also extends in the vehicle right-left direction, similarly to the first pipe material 21. The second pipe material 22 is constituted by the same pipe material of high tensile steel as the first pipe material 21. The length of the second pipe material 22 in the right-left direction (that is, in the up-down direction on the plane of paper of FIG. 2) is shorter than the length of the first pipe material 21 in the right-left direction. Differently from the right end part of the first pipe material 21, a right end part (that is, on the upper side on the plane of paper of FIG. 2) of the second pipe material 22 is joined to the right side member 5R. When the second pipe material 22 is placed behind the first pipe material 21 and the side members 5R, 5L are connected thereto as such, deformation of the vehicle body 12 at the time when a side collision occurs can be made small as compared to a structure in which the rockers 3R, 3L are connected to each other only via the first pipe material 21.

Further, as illustrated in FIG. 2, the right seat member 26R extending forward in the vehicle front-rear direction is connected to the right end part of the first pipe material 21. Similarly, the left seat member 26L extending forward in the vehicle front-rear direction is connected to the left end part of the first pipe material 21. Front end parts of the seat members 26R, 26L are connected to each other via the front crossmember 24. Although not illustrated herein, the front crossmember 24 includes a bottom wall extending in the up-down direction (that is, from the near side to the depth side on the plane of paper of FIG. 2), and side walls extending rearward in the vehicle front-rear direction from the opposite ends of the bottom wall. That is, the front crossmember 24 is not constituted by a pipe material, and the front crossmember 24 has a rectangular sectional shape opened rearward in the vehicle front-rear direction. Similarly, the seat members 26R, 26L have a rectangular sectional shape opened downward in the vehicle up-down direction. Front ends of the seat members 26R, 26L are inserted into a rear part, of the front crossmember 24, that is opened. Hereby, the seat members 26R, 26L are connected to each other via the front crossmember 24. The leg portions 28 are placed below the opposite ends, in the right-left direction, of the front crossmember 24. The leg portions 28 connect the front crossmember 24 to the floor panel 2.

Electric devices 6R, 6L in the electric device unit 6 are placed above the floor panel 2 so as to be surrounded by the seat mount 20. As has been described earlier, large electric power stored in the battery unit 4 is applied to the electric devices 6R, 6L. By placing the electric devices 6R, 6L inside the seat mount 20, it is possible to reduce loads to be applied to the electric devices 6R, 6L at the time when a collision occurs.

In the center of the first pipe material 21 in the right-left direction, a right seat bracket 30R and a left seat bracket 30L are placed adjacently in the vehicle right-left direction. The right seat bracket 30R fixes a right seat leg portion 19R of the right seat 18R to the first pipe material 21. Similarly, the left seat bracket 30L fixes a left seat leg portion 19L of the left seat 18L to the first pipe material 21. As such, the seat brackets 30R, 30L fix the seats 18R, 18L to the first pipe material 21. The right seat bracket 30R includes a bracket lower 32. The bracket lower 32 extends in the right-left direction along the first pipe material 21 and is connected to the left seat bracket 30L.

Figure 3:
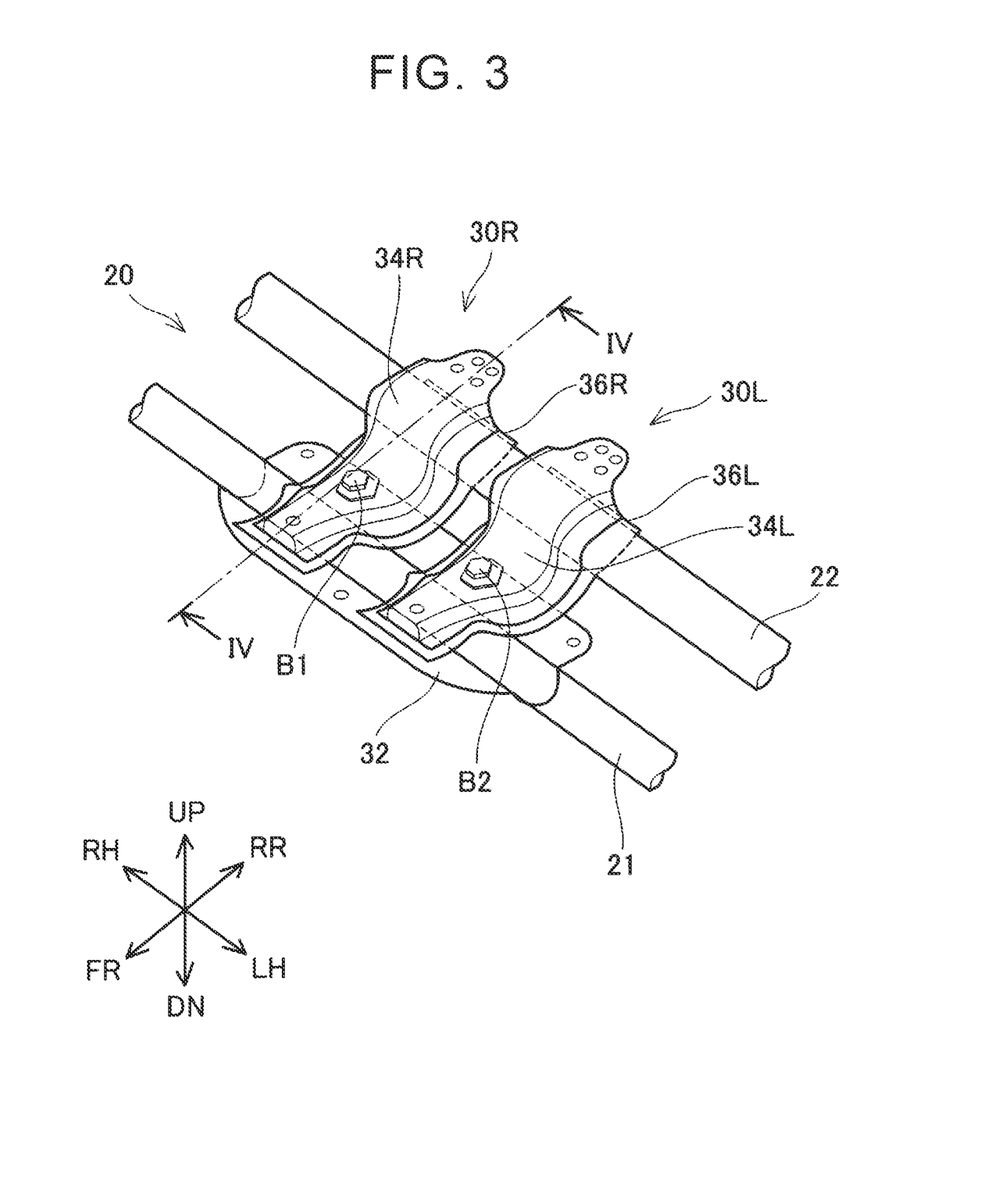
FIG. 3 is a perspective view around a seat bracket.

With reference to FIGS. 3, 4, structures of the seat brackets 30R, 30L will be described in detail. As illustrated in FIG. 3, the right seat bracket 30R further includes a right bracket upper 34R and a right bracket middle 36R in addition to the bracket lower 32. The bracket lower 32 is placed below the first pipe material 21. As illustrated in FIG. 4, the bracket lower 32 abuts with the first pipe material 21 so as to cover an outer peripheral surface of the first pipe material 21 from below. Note that the right seat leg portion 19R (see FIG. 2) is fixed to an upper part of the right bracket upper 34R by a right bolt B1, and the left seat leg portion 19L (see FIG. 2) is fixed to an upper part of the left bracket upper 34L by a left bolt B2. However, for easy understanding of the structures of the seat brackets 30R, 30L, the seat leg portions 19R, 19L are not illustrated in FIG. 3.

As illustrated in FIG. 4, the right bracket middle 36R is placed above the bracket lower 32. The right bracket middle 36R extends to below the second pipe material 22 by passing through above the first pipe material 21. A front end part of the right bracket middle 36R extends forward in the vehicle front-rear direction along a front end part of the bracket lower 32. A lower surface of the front end part of the right bracket middle 36R abuts with an upper surface of the front end part of the bracket lower 32. The front end part of the right bracket middle 36R is welded to the front end part of the bracket lower 32. Further, in the sectional view of FIG. 4, the bracket lower 32 is separated from the right bracket middle 36R in the up-down direction behind the first pipe material 21. However, as illustrated in FIG. 3, a central part of the right bracket middle 36R in the right-left direction projects upward, and the opposite end parts of the right bracket middle 36R in the right-left direction abuts with the upper surface of the bracket lower 32. The opposite end parts of the right bracket middle 36R in the right-left direction are welded to the bracket lower 32. That is, the bracket lower 32 is welded to the right bracket middle 36R on the opposite sides of the first pipe material 21 in the front-rear direction. Hereby, the right bracket middle 36R is fixed to the bracket lower 32. As a result, the first pipe material 21 is sandwiched between the right bracket middle 36R and the bracket lower 32.

As has been described earlier, the first pipe material 21 is constituted by the high tensile steel heated and subjected to special processing. When the brackets are fixed to such a pipe material by welding, the strength of the first pipe material 21 may decrease due to heating at the time of welding. Accordingly, by welding the right bracket middle 36R to the bracket lower 32, it is possible to reduce heating at the time of welding to the first pipe material 21. This consequently restrains a decrease in the strength of the first pipe material 21.

Further, a rear part of the right bracket middle 36R wraps around the second pipe material 22 from below and abuts with the second pipe material 22 such that the rear part of the right bracket middle 36R covers the outer peripheral surface of the second pipe material 22 from below. That is, the rear part of the right bracket middle 36R is fixed to the second pipe material 22 from below. The right bracket upper 34R is placed above the right bracket middle 36R. The right bracket upper 34R is placed above the first pipe material 21 and the second pipe material 22. The right bracket upper 34R extends to the second pipe material 22 by passing through above the first pipe material 21 and bends upward in front of the second pipe material 22. The right bracket upper 34R bends to cover an outer peripheral surface of the second pipe material 22 from forward and from above and further extends rearward.

As illustrated in FIG. 3, the central part of the right bracket upper 34R in the right-left direction projects upward. That is, the right bracket upper 34R has a so-called bead shape in its central part in the right-left direction. Hereby, the rigidity of the right bracket upper 34R particularly to the up-down direction and the front-rear direction improves. Similarly, as has been described earlier, a central part of the right bracket middle 36R in the right-left direction also projects. As a result, as illustrated in FIG. 4, a lower surface of the central part of the right bracket upper 34R abuts with an upper surface of the central part of the right bracket middle 36R.

The right bracket upper 34R covers the second pipe material 22 from above, and as illustrated in FIG. 3, an end part of the right bracket upper 34R in the right-left direction abuts with an upper surface of the outer peripheral surface of the second pipe material 22. As a result, the second pipe material 22 is sandwiched between the right bracket upper 34R and the right bracket middle 36R.

As illustrated in FIG. 4, the right bracket middle 36R has a through-hole placed between the first pipe material 21 and the second pipe material 22. A right nut N1 is fixed by welding below the through-hole of the right bracket middle 36R. The right bracket upper 34R also has a through-hole communicating with the through-hole of the right bracket middle 36R. The right seat leg portion 19R of the right seat 18R is placed above the right bracket upper 34R. The right seat leg portion 19R also has a through-hole, and the through-hole of the right seat leg portion 19R communicates with the through-hole of the right bracket upper 34R. The right bolt B1 is also inserted into the right seat leg portion 19R from above the through-hole and threadedly engages with the right nut N1 of the right bracket middle 36R. Hereby, the right seat leg portion 19R is fixed to the right seat bracket 30R. Thus, the right seat bracket 30R fixes the right seat leg portion 19R (that is, the right seat 18 in FIG. 2) to the first pipe material 21 of the seat mount 20.

An occupant (see FIG. 1) of the vehicle 10 sits on the right seat 18R. The occupant thus sitting is fixed by a seatbelt (not illustrated) to the right seat 18R. Accordingly, when the vehicle 10 has a front end collision, for example, inertia force corresponding to a weight obtained by adding the weight of the occupant to the weight of the right seat 18R occurs to the right seat 18R. The inertia force thus occurring to the right seat 18R is applied to the right seat leg portion 19R as a load F1 directed forward in the vehicle front-rear direction and upward in the vehicle up-down direction, as illustrated in FIG. 4. The load F1 is transmitted to the right seat bracket 30R via the right seat leg portion 19R. As a result, the right seat bracket 30R applies the load F1 to the central parts, in the right-left direction, of the first pipe material 21 and the second pipe material 22. As illustrated in FIG. 2, only the opposite ends of the first pipe material 21 and the opposite ends of the second pipe material 22 are supported by the vehicle body 12. Accordingly, the first pipe material 21 and the second pipe material 22 easily deform due to the load F1 to be applied to the central parts, in the right-left direction, of the first pipe material 21 and the second pipe material 22.

As has been described earlier, the bracket lower 32 placed below the first pipe material 21 extends along the first pipe material 21 and covers the first pipe material 21 from below. The bracket lower 32 transmits the load F1 dispersedly in the right-left direction (that is, to the near side and to the depth side on the plane of paper in FIG. 4) of the first pipe material 21. As a result, the stress to be transmitted from the bracket lower 32 to the first pipe material 21 decreases. Thus, the bracket lower 32 can restrain deformation of the first pipe material 21 due to the load F1 direction forward in the vehicle front-rear direction and upward in the vehicle up-down direction.

Further, as has been described earlier, the right bracket middle 36R covers the outer peripheral surface of the second pipe material 22 from below the second pipe material 22. On this account, the load F1 is also transmitted to the second pipe material 22 via the right bracket middle 36R. Hereby, since the load F1 is dispersed to the first pipe material 21 and the second pipe material 22, the stress to be applied to the central part, in the right-left direction, of the first pipe material 21 further decreases. As a result, it is possible to further restrain deformation of the first pipe material 21 due to the load F1.

At the time when the vehicle 10 (see FIG. 1) is traveling, a load F2 directed downward may be applied to the right seat bracket 30R via the right seat leg portion 19R due to vibrations of the vehicle 10, for example. As has been described earlier, the right bracket middle 36R is placed above the first pipe material 21. As illustrated in FIGS. 3, 4, the end parts, in the right-left direction, of the right bracket middle 36R cover the outer peripheral surface of the first pipe material 21 from above. Hereby, the load F2 directed downward and applied to the right seat bracket 30R is transmitted to the first pipe material 21. As has been described earlier, the bracket lower 32 is welded to the right bracket middle 36R on the opposite sides of the first pipe material 21 in the front-rear direction. On this account, the load F2 directed downward is dispersed to the first pipe material 21 and the bracket lower 32 via the right bracket middle 36R. As a result, the stress to be applied to the first pipe material 21 further decreases. As a result, it is possible to restrain deformation of the first pipe material 21 due to the load F2.

Further, the right bracket upper 34R is place above the right bracket middle 36R. The right bracket upper 34R is fixed to the right bracket middle 36R by the right bolt B1. The right bracket upper 34R covers the outer peripheral surface of the second pipe material 22 from above the second pipe material 22. Accordingly, when the load F2 directed downward is applied to the right seat bracket 30R, the load F2 is dispersed to the first pipe material 21 and the second pipe material 22, so that the stress to be applied to the first pipe material 21 further decreases. Hereby, it is possible to further restrain deformation of the first pipe material 21 due to the load F2.

By sandwiching the first pipe material 21 in the up-down direction by the right seat bracket 30R of the vehicle 10 (see FIG. 1) as such, it is possible to restrain deformation of the first pipe material 21. Further, by placing the second pipe material behind the first pipe material 21 and connecting the pipe materials 21, 22 via the right seat bracket 30R, it is possible to further restrain deformation of the pipe materials 21, 22.

Further, as illustrated in FIG. 3, the left seat bracket 30L via which the left seat 18L (see FIG. 2) is connected to the pipe materials 21, 22 also has a structure similar to the right seat bracket 30R described above. The left bracket upper 34L has the same shape as the right bracket upper 34R. The left bracket middle 36L has the same shape as the right bracket middle 36R. With such a configuration, it is possible to improve productivity of the seat brackets 30R, 30L.

Further, since the bracket lower 32 of the right seat bracket 30R is shared with the left seat bracket 30L adjacent to the right seat bracket 30R in the right-left direction, the bracket lower 32 extends in the right-left direction along the first pipe material 21. Hereby, the loads F1, F2 are further dispersed by the bracket lower 32, so that the stress to be applied to the first pipe material 21 further decreases. As a result, it is possible to further restrain deformation of the first pipe material 21.

Correspondence

The right bracket middle 36R is an example of a "bracket upper." The right bracket upper 34R is an example of a "second bracket upper." The left bracket middle 36L is an example of a "third bracket upper." The left bracket upper 34L is an example of a "fourth bracket upper."

The embodiment has been described in detail, but the embodiment is only an example and does not limit the scope of Claims. The technology described in the scope of the claims includes the foregoing example with various modifications and changes. The following describes modifications of the above embodiment.

Modification 1

The seat mount 20 may not include the second pipe material 22.

Modification 2

The right seat bracket 30R may not include the right bracket upper 34R. In this case, the right seat leg portion 19R may be fixed only to the right bracket middle 36R.

Modification 3

The seat 18 may be a single seat. In this case, the left seat bracket 30L adjacent to the right seat bracket 30R may not be provided.

Modification 4

The left bracket upper 34L may not have the same shape as the right bracket upper 34R, and the left bracket middle 36L may not have the same shape as the right bracket middle 36R.

Modification 5

The first pipe material 21 may not be made of high tensile steel. Further, in another modification, the second pipe material 22 may not be made of high tensile steel.

Modification 6

The vehicle 10 may not include the battery unit 4 below the floor panel 2.

Modification 7

In the vehicle 10, the electric devices may not be provided between the seat 18 and the floor panel 2.

The specific example of the present disclosure has been explained in detail. However, the example is for illustration only, and does not limit the scope of the claims. The technology described in the scope of the claims includes the foregoing example with various modifications and changes. Each of and various combinations of the technical elements described in this specification and the drawings achieve technical utility, and the technical elements are not limited to the combination stated in the claims at the time of filing. The technology described in this specification and the drawings as an example is able to achieve the plurality of objectives simultaneously and has technical utility by achieving one of the objectives.

What is claimed is:

1. A vehicle comprising:
   a vehicle body including a pipe material extending in a vehicle right-left direction and a second pipe material placed behind the pipe material in a vehicle front-rear direction;
   a seat provided in the vehicle body such that an occupant of the vehicle sits on the seat; and
   a seat bracket via which the seat is fixed to the pipe material, wherein the seat bracket includes:
   a bracket lower placed below the pipe material, and
   a bracket upper placed above the pipe material such that the pipe material is sandwiched between the bracket upper and the bracket lower, the bracket upper extending rearward in the vehicle front-rear direction from the pipe material toward the second pipe material and is fixed to the second pipe material from below.

2. The vehicle according to claim 1, wherein the seat bracket further includes a second bracket upper placed above the second pipe material such that the second pipe material is sandwiched between the second bracket upper and the bracket upper.

3. The vehicle according to claim 2, wherein:
   the seat bracket further includes a third bracket upper; and
   the third bracket upper is adjacent to the bracket upper in the vehicle right-left direction and placed above the pipe material such that the pipe material is sandwiched between the third bracket upper and the bracket lower.

4. The vehicle according to claim 3, wherein the third bracket upper has the same shape as the bracket upper.

5. The vehicle according to claim 3, wherein:
   the seat bracket further includes a fourth bracket upper; and
   the fourth bracket upper is placed above the second pipe material such that the second pipe material is sandwiched between the fourth bracket upper and the third bracket upper.

6. The vehicle according to claim 5, wherein the fourth bracket upper has the same shape as the second bracket upper.

7. The vehicle according to claim 1, wherein at least either of the pipe material and the second pipe material is made of high tensile steel.

8. The vehicle according to claim 1, wherein:
the vehicle body further includes a floor panel placed below the pipe material; and
a battery as a driving power supply for the vehicle is provided below the floor panel.

9. The vehicle according to claim 8, wherein an electric device connected to the battery is provided between the floor panel and the seat.

* * * * *